(12) United States Patent
Edgar et al.

(10) Patent No.: US 6,540,416 B2
(45) Date of Patent: Apr. 1, 2003

(54) SYSTEM AND METHOD FOR DIGITAL FILM DEVELOPMENT USING VISIBLE LIGHT

(75) Inventors: Albert D. Edgar, Austin, TX (US); Stacy S. Cook, Austin, TX (US)

(73) Assignee: Applied Science Fiction, Inc., Austin, TX (US)

(*) Notice: Subject to any disclaimer, the term of this patent is extended or adjusted under 35 U.S.C. 154(b) by 0 days.

(21) Appl. No.: 09/752,013

(22) Filed: Dec. 29, 2000

(65) Prior Publication Data

US 2001/0031144 A1 Oct. 18, 2001

Related U.S. Application Data

(60) Provisional application No. 60/174,055, filed on Dec. 30, 1999.

(51) Int. Cl.[7] .......................... G03D 5/00; G03D 13/00; G03D 27/54
(52) U.S. Cl. .......................... 396/567; 396/604; 355/27; 355/28; 355/70; 355/77
(58) Field of Search ................................. 396/604, 639, 396/567–570; 355/27–29, 40, 41, 67–70, 77; 358/487

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/93 |
| 3,615,479 A | 10/1971 | Kohler et al. | 96/48 |
| 3,615,498 A | 10/1971 | Aral et al. | 96/55 |
| 3,617,282 A | 11/1971 | Bard et al. | 96/59 |
| 3,747,120 A | 7/1973 | Stemme | 346/75 |
| 3,833,161 A | 9/1974 | Krumbein | 226/92 |
| 3,903,541 A | 9/1975 | Von Meister et al. | 354/317 |
| 3,946,398 A | 3/1976 | Kyser et al. | 346/1 |
| 3,959,048 A | 5/1976 | Stanfield et al. | 156/94 |
| 4,026,756 A | 5/1977 | Stanfield et al. | 156/554 |
| 4,081,577 A | 3/1978 | Horner | 427/424 |
| 4,142,107 A | 2/1979 | Hatzakis et al. | 250/571 |
| 4,215,927 A | 8/1980 | Grant et al. | 354/317 |
| 4,249,985 A | 2/1981 | Stanfield | 156/554 |
| 4,265,545 A | 5/1981 | Slaker | 356/431 |
| 4,301,469 A | 11/1981 | Modeen et al. | 358/75 |

(List continued on next page.)

FOREIGN PATENT DOCUMENTS

| | | | | |
|---|---|---|---|---|
| EP | 0 261 782 A2 | 8/1987 | | H04N/1/46 |
| EP | 0 422 220 A1 | 3/1989 | | A61B/6/03 |
| EP | 0 482 790 B1 | 9/1991 | | H04N/1/40 |

(List continued on next page.)

OTHER PUBLICATIONS

"*Adaptive Fourier Threshold Filtering: A Method to Reduce Noise and Incoherent Artifacts in High Resolution Cardiac Images*", Doyle, M., et al., 8306 Magnetic Resonance in Medicine 31, No. 5, Baltimore, MD, May, 1994, pp. 546–550.

"*Anisotropic Spectral Magnitude Estimation Filters for Noise Reduction and Image Enhancement*", T. Aach, et al., Philips GmbH Research Laboratories, IEEE, pp. 335–338, 1996.

(List continued on next page.)

Primary Examiner—D Rutledge
(74) Attorney, Agent, or Firm—Dinsmore & Shohl LLP

(57) ABSTRACT

One embodiment is a system for the development of a film includes an infrared light source and a visible light source. The system also includes at least one sensor operable to collect a first set of optical data from light associated the infrared light source and a second set of optical data from light associated with the visible light source. The system further includes a processor in communication with the at least one sensor, the processor operable to determine an image on the film in response to the first and second sets of optical data.

24 Claims, 4 Drawing Sheets

U.S. PATENT DOCUMENTS

| | | | |
|---|---|---|---|
| 4,490,729 A | 12/1984 | Clark et al. | 346/75 |
| 4,501,480 A | 2/1985 | Matsui et al. | 354/298 |
| 4,564,280 A | 1/1986 | Fukuda | 354/317 |
| 4,594,598 A | 6/1986 | Iwagami | 346/140 |
| 4,621,037 A | 11/1986 | Kanda et al. | 430/30 |
| 4,623,236 A | 11/1986 | Stella | 354/318 |
| 4,633,300 A | 12/1986 | Sakai | 358/41 |
| 4,636,808 A | 1/1987 | Herron | 346/75 |
| 4,666,307 A | 5/1987 | Matsumoto et al. | 356/404 |
| 4,670,779 A | 6/1987 | Nagano | 358/75 |
| 4,736,221 A | 4/1988 | Shidara | 354/317 |
| 4,741,621 A | 5/1988 | Taft et al. | 356/376 |
| 4,745,040 A | 5/1988 | Levine | 430/21 |
| 4,755,844 A | 7/1988 | Tsuchiya et al. | 354/317 |
| 4,777,102 A | 10/1988 | Levine | 430/21 |
| 4,796,061 A | 1/1989 | Ikeda et al. | 355/73 |
| 4,814,630 A | 3/1989 | Lim | 250/578 |
| 4,821,114 A | 4/1989 | Gebhardt | 358/75 |
| 4,845,551 A | 7/1989 | Matsumoto | 358/80 |
| 4,851,311 A | 7/1989 | Millis et al. | 430/30 |
| 4,857,430 A | 8/1989 | Millis et al. | 430/30 |
| 4,875,067 A | 10/1989 | Kanzaki et al. | 354/325 |
| 4,969,045 A | 11/1990 | Haruki et al. | 358/228 |
| 4,994,918 A | 2/1991 | Lingemann | 358/214 |
| 5,027,146 A | 6/1991 | Manico et al. | 354/299 |
| 5,034,767 A | 7/1991 | Netz et al. | 354/317 |
| 5,101,286 A | 3/1992 | Patton | 358/487 |
| 5,124,216 A | 6/1992 | Giapis et al. | 430/30 |
| 5,155,596 A | 10/1992 | Kurtz et al. | 358/214 |
| 5,196,285 A | 3/1993 | Thomson | 430/30 |
| 5,200,817 A | 4/1993 | Birnbaum | 358/80 |
| 5,212,512 A | 5/1993 | Shiota | 354/319 |
| 5,231,439 A | 7/1993 | Takahashi et al. | 354/313 |
| 5,235,352 A | 8/1993 | Pies et al. | 346/140 |
| 5,255,408 A | 10/1993 | Blackman | 15/308 |
| 5,266,805 A | 11/1993 | Edgar | 250/330 |
| 5,267,030 A | 11/1993 | Giorgianni et al. | 358/527 |
| 5,292,605 A | 3/1994 | Thomson | 430/30 |
| 5,296,923 A | 3/1994 | Hung | 358/527 |
| 5,334,247 A | 8/1994 | Columbus et al. | 118/411 |
| 5,350,651 A | 9/1994 | Evans et al. | 430/21 |
| 5,350,664 A | 9/1994 | Simons | 430/362 |
| 5,357,307 A | 10/1994 | Glanville et al. | 354/324 |
| 5,360,701 A | 11/1994 | Elton et al. | 430/501 |
| 5,371,542 A | 12/1994 | Pauli et al. | 348/262 |
| 5,391,443 A | 2/1995 | Simons et al. | 430/21 |
| 5,414,779 A | 5/1995 | Mitch | 382/199 |
| 5,416,550 A | 5/1995 | Skye et al. | 354/298 |
| 5,418,119 A | 5/1995 | Simons | 430/507 |
| 5,418,597 A | 5/1995 | Lahcanski et al. | 355/76 |
| 5,432,579 A | 7/1995 | Tokuda | 354/293 |
| 5,436,738 A | 7/1995 | Manico | 358/503 |
| 5,440,365 A | 8/1995 | Gates et al. | 354/298 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 358/500 |
| 5,477,345 A | 12/1995 | Tse | 358/500 |
| 5,496,669 A | 3/1996 | Pforr et al. | 430/22 |
| 5,516,608 A | 5/1996 | Hobbs et al. | 430/30 |
| 5,519,510 A | 5/1996 | Edgar | 358/471 |
| 5,546,477 A | 8/1996 | Knowles et al. | 382/242 |
| 5,550,566 A | 8/1996 | Hodgson et al. | 345/202 |
| 5,552,904 A | 9/1996 | Ryoo et al. | 358/518 |
| 5,563,717 A | 10/1996 | Koeng et al. | 358/406 |
| 5,568,270 A | 10/1996 | Endo | 358/298 |
| 5,576,836 A | 11/1996 | Sano et al. | 358/302 |
| 5,581,376 A | 12/1996 | Harrington | 358/518 |
| 5,587,752 A | 12/1996 | Petruchik | 396/315 |
| 5,596,415 A | 1/1997 | Cosgrove et al. | 358/296 |
| 5,627,016 A | 5/1997 | Manico | 430/434 |
| 5,649,260 A | 7/1997 | Wheeler et al. | 396/569 |
| 5,664,253 A | 9/1997 | Meyers | 396/603 |
| 5,664,255 A | 9/1997 | Wen | 396/627 |
| 5,667,944 A | 9/1997 | Reem et al. | 430/359 |
| 5,678,116 A | 10/1997 | Sugimoto et al. | 396/611 |
| 5,691,118 A | 11/1997 | Haye | 430/357 |
| 5,695,914 A | 12/1997 | Simon et al. | 430/379 |
| 5,698,382 A | 12/1997 | Nakahanada et al. | 430/418 |
| 5,726,773 A | 3/1998 | Mehlo et al. | 358/474 |
| 5,739,897 A | 4/1998 | Frick et al. | 355/40 |
| 5,771,107 A | 6/1998 | Fujimoto et al. | 358/464 |
| 5,790,277 A | 8/1998 | Edgar | 358/487 |
| 5,835,795 A | 11/1998 | Craig et al. | 396/6 |
| 5,835,811 A | 11/1998 | Tsumura | 396/598 |
| 5,870,172 A | 2/1999 | Blume | 355/27 |
| 5,880,819 A | 3/1999 | Tanaka et al. | 355/75 |
| 5,892,595 A | 4/1999 | Yamakawa et al. | 358/530 |
| 5,930,388 A | 7/1999 | Murakami et al. | 382/167 |
| 5,959,720 A | 9/1999 | Kwon et al. | 355/38 |
| 5,963,662 A | 10/1999 | Vachtsevanos et al. | 382/150 |
| 5,966,465 A | 10/1999 | Keith et al. | 382/232 |
| 5,979,011 A | 11/1999 | Miyawaki et al. | 15/308 |
| 5,982,936 A | 11/1999 | Tucker et al. | 382/233 |
| 5,982,937 A | 11/1999 | Accad | 382/239 |
| 5,982,941 A | 11/1999 | Loveridge et al. | 382/260 |
| 5,982,951 A | 11/1999 | Katayama et al. | 382/284 |
| 5,988,896 A | 11/1999 | Edgar | 396/604 |
| 5,991,444 A | 11/1999 | Burt et al. | 382/232 |
| 5,998,109 A | 12/1999 | Hirabayashi | 430/434 |
| 6,000,284 A | 12/1999 | Shin et al. | 73/150 |
| 6,005,987 A | 12/1999 | Nakamura et al. | 382/294 |
| 6,065,824 A | 5/2000 | Bullock et al. | 347/19 |
| 6,069,714 A | 5/2000 | Edgar | 358/487 |
| 6,088,084 A | 7/2000 | Nishio | 355/75 |
| 6,089,687 A | 7/2000 | Helterline | 347/7 |
| 6,101,273 A | 8/2000 | Matama | 382/169 |
| 6,102,508 A | 8/2000 | Cowger | 347/7 |
| 6,137,965 A | 10/2000 | Burgeios et al. | 396/626 |
| 6,200,738 B1 | 3/2001 | Takano et al. | 430/362 |

FOREIGN PATENT DOCUMENTS

| | | | |
|---|---|---|---|
| EP | 0 525 886 A3 | 7/1992 | G03D/5/00 |
| EP | 0 580 293 A1 | 6/1993 | H04N/1/04 |
| EP | 0 580 293 A | 1/1994 | H04N/1/04 |
| EP | 0 601 364 A1 | 6/1994 | H04N/1/387 |
| EP | 0 669 753 A2 | 2/1995 | H04N/1/407 |
| EP | 0 768 571 A2 | 4/1997 | G03D/13/00 |
| EP | 0 794 454 A2 | 9/1997 | G03B/27/73 |
| EP | 0 806 861 A1 | 11/1997 | H04N/1/00 |
| EP | 0 878 777 A2 | 11/1998 | G06T/5/40 |
| EP | 0 930 498 A2 | 7/1999 | G01N/21/88 |
| WO | WO 90/01240 | 2/1990 | H04N/1/40 |
| WO | WO 91/09493 | 6/1991 | H04N/5/217 |
| WO | WO 97/25652 | 7/1997 | G03D/5/00 |
| WO | WO 98/19216 | 5/1998 | G03C/5/29 |
| WO | WO 98/19216 A | 5/1998 | G03C/5/29 |
| WO | WO 98/25399 | 6/1998 | H04N/1/38 |
| WO | WO 98/25399 A | 6/1998 | H04N/1/38 |
| WO | 98-31142 * | 7/1998 | |
| WO | WO 98/31142 | 7/1998 | H04N/5/253 |
| WO | 98-34157 * | 8/1998 | |
| WO | WO 98/34157 | 8/1998 | |
| WO | WO 98/34157 A | 8/1998 | |
| WO | WO 98/34397 | 8/1998 | |
| WO | WO 99/43148 | 8/1999 | H04N/1/00 |
| WO | WO 99/43149 A1 | 8/1999 | H04N/1/00 |
| WO | WO 01/01197 | 1/2001 | G03D/5/00 |
| WO | WO 01/01197 A | 1/2001 | G03D/5/00 |
| WO | WO 01/13174 A1 | 2/2001 | G03D/5/06 |
| WO | WO 01/13174 | 2/2001 | G03D/5/06 |

| WO | WO 01/45042 A1 | 6/2001 | ............ G06T/5/00 |
| WO | WO 01/50192 A1 | 7/2001 | ........... G03C/7/407 |
| WO | WO 01/50193 A1 | 7/2001 | ........... G03C/7/407 |
| WO | WO 01/50194 A1 | 7/2001 | ........... G03C/7/407 |
| WO | WO 01/50197 A1 | 7/2001 | ............ G03C/7/42 |
| WO | WO 01/52556 A2 | 7/2001 | ............ H04N/9/11 |

OTHER PUBLICATIONS

"Adaptive–neighborhood filtering of images corrupted by signal–dependent noise", R. Rangayyan, et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", D. Stimpson, et al., Research Reports, BioTechniques, vol. 25, No. 5, pp. 886–890, 1998.

"Low–Cost Display Assembly and Interconnect Using Ink–Jet Printing Technology", D. Hayes, et al., Display Works '99, MicroFab Technologies, Inc., pp. 1–4, 1999.

"Ink–Jet Based Fluid Microdispensing in Biochemical Applications", D. Wallace, MicroFab Technologies, Inc., Laboratory Automation New, vol. 1, No. 5, pp. 3, 6–9, Nov., 1996.

"Photorealistic Ink–Jet Printing through Dynamic Spot Size Control", D. Wallace, et al., Journal of Imaging Science and Technology, vol. 40. No. 5, pp. 390–395, Sep./Oct. 1996.

"MicroJet Printing of Solder and Polymers for Multi–Chip Modules and Chip–Scale Package", D. Hayes, et al., Micro-Fab Technologies, Inc. (6 pages).

"A Method of Characteristics Model of a Drop–on–Demand Ink–Jet Device Using an Integral Method Drop Formation Model", D. Wallace, MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, Nikon Corporation, Nov. 28, 2000.

* cited by examiner

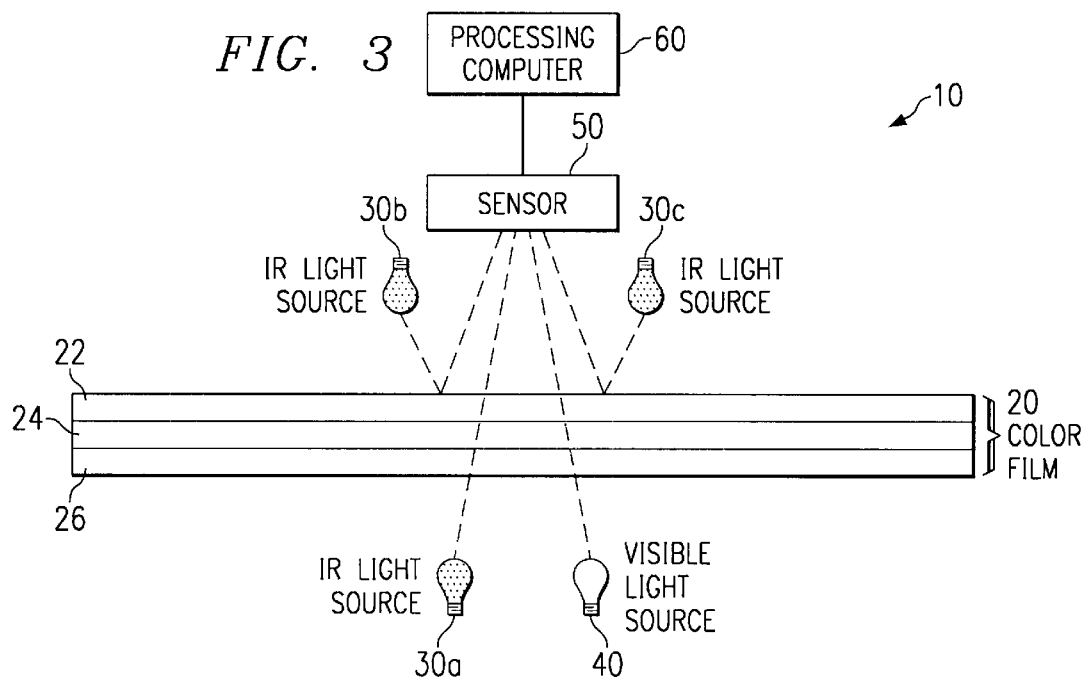
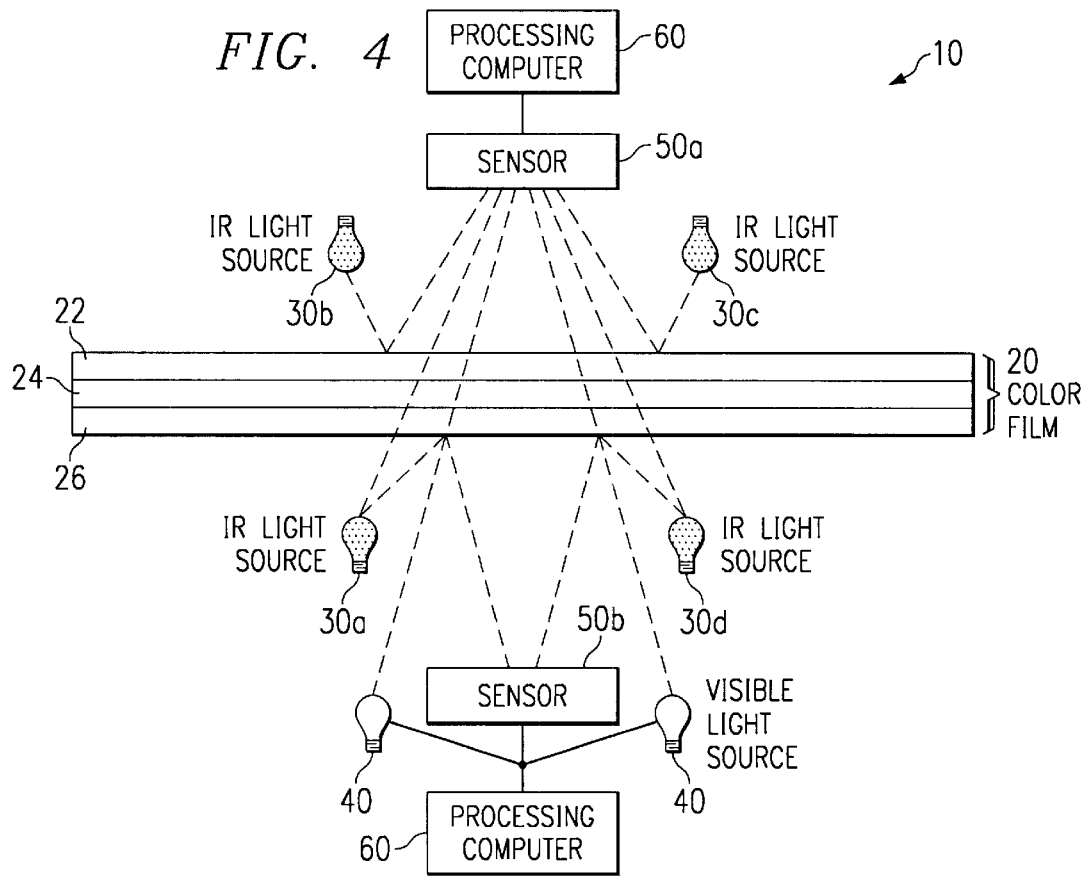

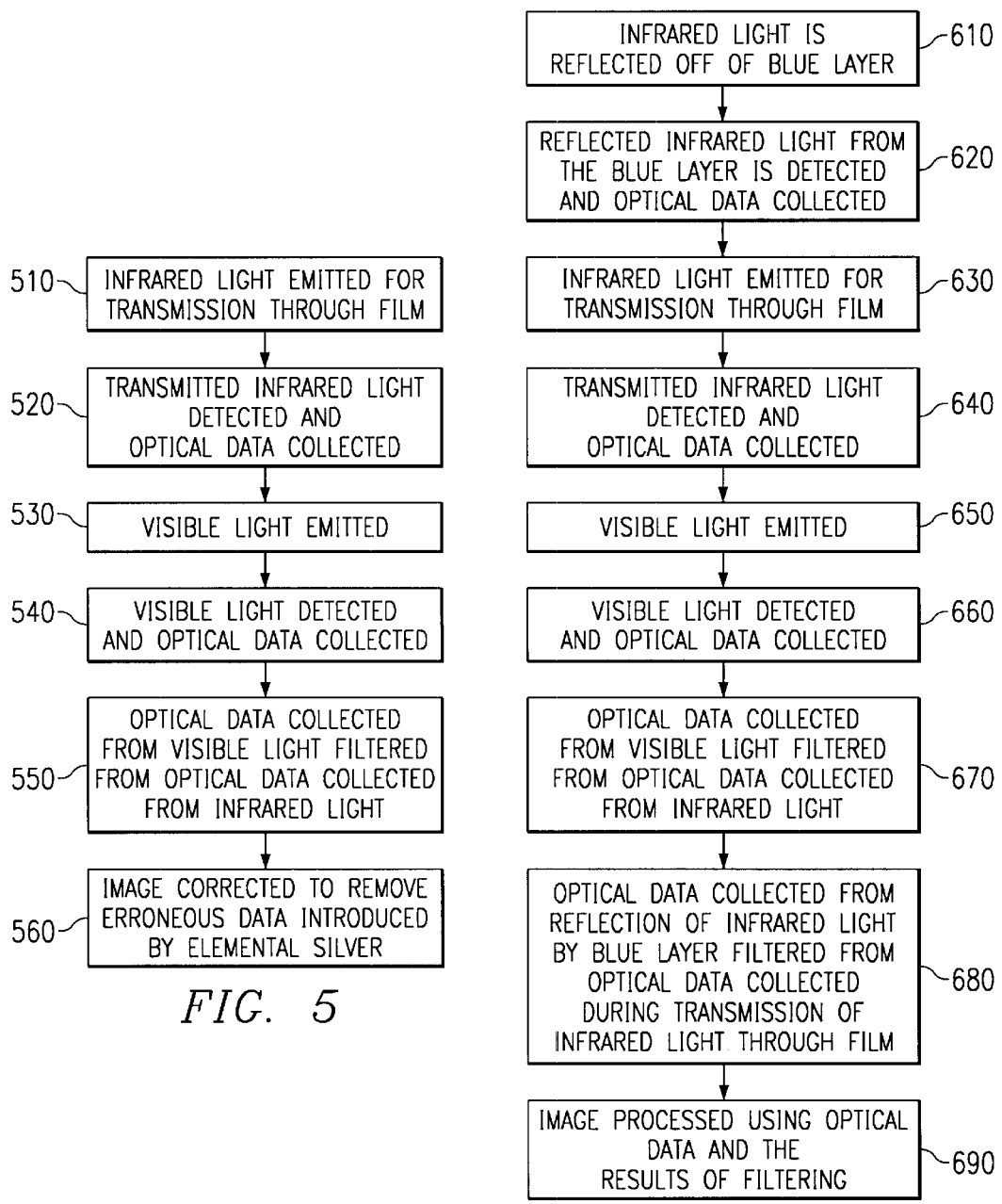

SYSTEM AND METHOD FOR DIGITAL FILM DEVELOPMENT USING VISIBLE LIGHT

RELATED APPLICATIONS

This application claims priority under 35 U.S.C. § 119(e) of United States Provisional Patent Application Ser. No. 60/174,055, entitled System and Method for Digital Film Development Using Visible Light, and having a filing date of Dec. 30, 1999.

This application is related to the following copending U.S. patent applications: Improved System and Method for Digital Film Development Using Visible Light, Ser. No. 09/751,378, and having a priority filing date of Dec. 30, 1999; Method and System for Capturing Film Images, Ser. No. 09/774,544, and having a priority filing date of Feb. 3, 2000; System and Method for Digital Dye Color Film Processing, Ser. No. 09/751,473, and having a priority date of Dec. 30, 1999; and Scanning Apparatus and Digital Film Processing Method, Ser. No. 09/751,403, and having a priority filing date of Dec. 30, 1999.

TECHNICAL FIELD OF THE INVENTION

This invention relates in general to the development of film and more particularly to a system and method of digital film development using visible light.

BACKGROUND OF THE INVENTION

During conventional chemical film processing, several different solutions are normally applied throughout the development process in order to produce a negative. Developer is applied to expose film to convert exposed silver halides into elemental silver. The by-product of this reaction reacts with couplers in order to create color dyes within the film. The reaction is stopped by a stopping solution. Any unreacted silver halides and the elemental silver present in the film layers is washed out of the film. The completed negative includes separate emulsion layers composed of color dyes.

Conventional scanner systems generally digitize film using visible light to detect and measure the colors associated with the color dyes in the negative. Conventional scanner systems require that the silver halide and elemental silver particles be washed from the film. The elemental silver particles will block, or occlude, the light and cause speckling used to detect and measure the dye clouds in the negative.

In digital film development, after the application of developer, the developing film is scanned at certain time intervals using infrared light so as not to fog the developing film. Color is derived from the silver latent image detected during development by taking advantage of the milkish opacity of the elemental silver to optically separate the individual layers. Once separate optical data is identified for each layer of emulsion, optical data associated with each layer of blue, green, and red emulsion is used to digitally create a color image.

Conventional digital film processing systems utilize infrared light in order to avoid fogging the film as it develops. In particular, each layer of the developing film remains photosensitive to visible light during the digital film process. The film is not substantially photosensitive to infrared light, which allows the silver latent image to be scanned at multiple development intervals.

One advantage usually associated with digital film development is the ability to develop film using a single application of developer. Digital film development does not require, for example, the stop, fix, clear, wash, wetting agent, and dry processing steps, nor the additional developer or other chemical solutions, used in chemical film processing. As digital film development primarily uses infrared light to detect the level of exposure of silver halides, the presence of elemental silver during such processing may inhibit accurate detection of images represented on the blue, green, and red layers of film emulsion similar to other defects such as scratches and other abnormalities. This problem may be particularly pronounced in detecting latent images held in the green layer of the film emulsion that is generally more difficult to discern relative to latent images held in the upper blue layer and lower red layer of film emulsion.

SUMMARY OF THE INVENTION

In accordance with the present invention, a system and method for digital film development using visible light is provided that substantially eliminates or reduces disadvantages and problems associated with previously developed systems and methods. In particular, the system and method for digital film development using visible light allows for the reduction of disadvantages during film processing that are associated with the presence of elemental silver.

In one embodiment of the present invention, a system for the development of a film is provided that includes an infrared light source and a visible light source. The system also includes at least one sensor operable to collect a first set of optical data from light associated with the infrared light source and a second set of optical data from light associated with the visible light source. The system further includes a processor in communication with the at least one sensor, the processor operable to determine an image on the film in response to the first and second sets of optical data.

In a second embodiment of the present invention, a method of digital film development is presented that includes comparing a first set of optical data collected during a transmission of infrared light through a film with a second set of optical data collected during a transmission of visible light through the film.

Technical advantages of the present invention include providing a system and method for digital film development using visible light that reduces disadvantages and problems associated with previously developed systems and methods. In particular, various embodiments of the present invention allow undesirable data introduced by the presence of elemental silver to be removed or filtered. Additionally, various embodiments of the present invention present higher quality digital images by eliminating defects caused by the presence of elemental silver. A further advantage of various embodiments of the present invention is that more detailed image production is accomplished without the need for additional developers or other chemical solutions.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings in which:

FIG. 3 illustrates a schematic diagram of an additional embodiment of a digital film processing system that utilizes infrared and visible light in detecting a latent image on a film;

FIG. 4 illustrates a schematic diagram of yet another embodiment of a digital film processing system that utilizes infrared and visible light in detecting a latent image on a film;

FIG. 5 illustrates a flowchart of one embodiment of a digital film development process implemented using visible light;

FIG. 6 illustrates a flowchart of another embodiment of a digital film development process using visible light and the independent collection of optical data associated with a blue layer of film.

DETAILED DESCRIPTION OF THE INVENTION

FIGS. 1 through 7 illustrate various embodiments of a system and process for enhancing the digital development of film utilizing data collected during the exposure of the film to visible light and infrared light. By utilizing visible light during the development process, a digital image is produced that is compared to data collected during the exposure of the film to infrared light. Such a comparison compensates for the presence of elemental silver during the collection of data using infrared light. In particular, following the collection of data during exposure of film to infrared light, additional data is collected during exposure of the film to visible light. The visible light data is then filtered using the infrared light data in order to produce a final digital image that does not include defects introduced by elemental silver. Various embodiments of the described invention also introduce additional processes of data collection and the filtering of such collected data in order to achieve further improvements in image quality during the digital development of film.

Figure 1:
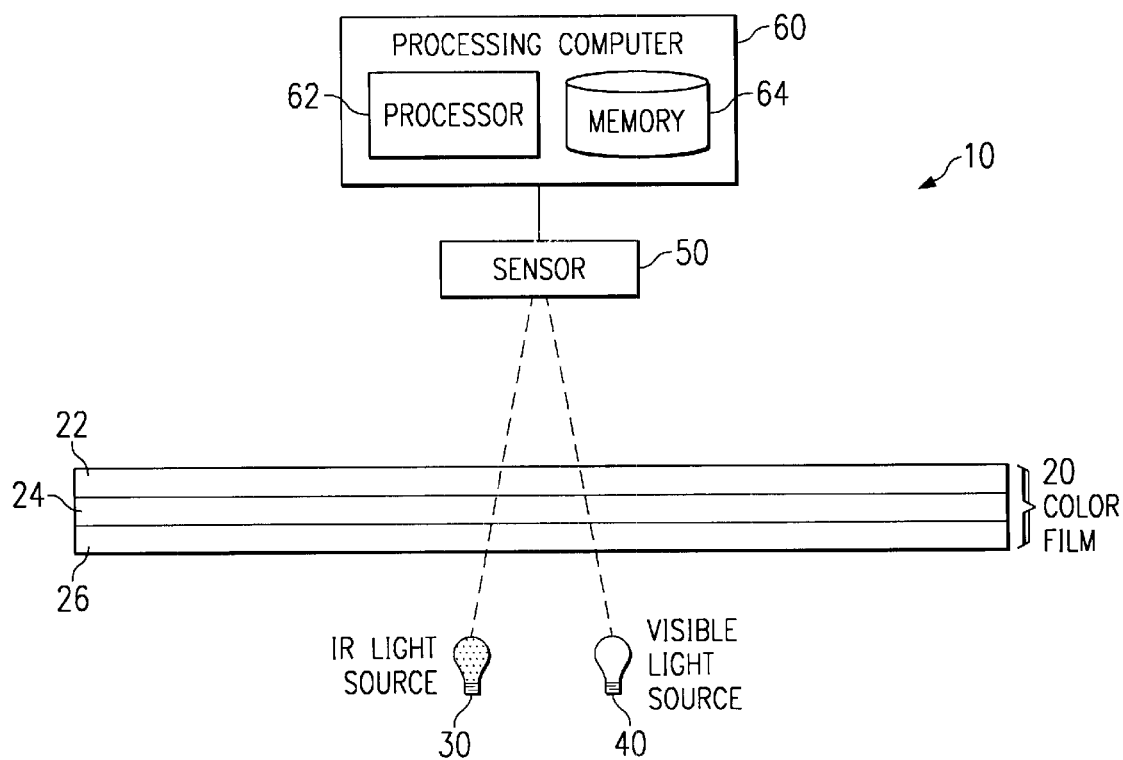
FIG. 1 illustrates a schematic diagram of one embodiment of a digital film processing system that utilizes both infrared and visible light in detecting a latent image on a film.

FIG. 1 illustrates one embodiment of a digital film processing system 10 that utilizes both infrared and visible light in detecting a latent image on exposed and developing film such as a film 20. System 10 includes an infrared light source 30, a visible light source 40, and a sensor 50 coupled to a processing computer 60. In the illustrated embodiment, sensor 50 is positioned on the opposite side of film 20 from infrared light source 30 and visible light source 40.

In the illustrated embodiment, film 20 includes multiple layers of emulsion such as a blue layer 22, a green layer 24, and a red layer 26. Alternatively, film 20 may include any number of layers corresponding to differences in image characteristics specific to each of the layers. For example, film 20 may include layers specific to different colors or speeds, a particular grain size, or any other suitable distinguishing characteristics.

In the illustrated embodiment, infrared light source 30 is a linear array of light emitting diodes (LEDs) used in combination with a suitable lens for focusing infrared light; however, infrared light source 30 may be any combination of one or more sources of infrared light in any suitable combination such that a desired portion or lateral width of film 20, hereafter referred to as a segment of film 20, is illuminated by light originating from infrared light source 30. For example, infrared light source 30 may be a linear array of LEDs assembled in combination with one or more amplifiers and wave guides such that a predetermined lateral width of film 20 is illuminated at a desired intensity. Infrared light source 30 may be suitably positioned and oriented relative to film 20 and sensor 50 depending on film type and processing conditions. In one embodiment, infrared light source 30 is a reflectometer such as an ellipsometer.

In the illustrated embodiment, visible light source 40 is a tri-linear array of light emitting diodes (LEDs) used in combination with suitable lens for focusing visible light; however, visible light source 40 may be any combination of one or more sources of visible light in any suitable combination such that a segment of film 20 is illuminated by light originating from visible light source 40. For example, visible light source 40 may be a tri-linear array of red-green-blue LEDs assembled in combination with one or more wave guides such that a predetermined lateral width of film 20 is illuminated at a desired intensity. Visible light source 40 may be suitably positioned and oriented relative to film 20 and sensor 50 depending on film type and processing conditions. In one embodiment, visible light source 40 is a reflectometer such as an ellipsometer. Various embodiments of digital film processing system 10 may incorporate visible light source 40 and infrared light source 30 in a single device. For example, a broadband light source produces both infrared and visible light that can be sensed individually.

Different colors of light interact differently with the film 20. Visible light interacts with the dyes and silver within the film 20. Whereas, infrared light interacts with the silver, but the dye dyes are generally transparent to infrared light. The term "color" is used to generally describe specific frequency bands of electromagnetic radiation, including visible and non-visible light. Visible light, as used herein, means electromagnetic radiation having a frequency or frequency band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light within a frequency band of approximately 400 nm to 500 nm. Near infrared light is generally associated with radiation within a frequency band of approximately 700 nm to 1500 nm. Although specific colors and frequency bands are described herein, the film 210 may be scanned with other suitable colors and frequency ranges without departing from the spirit and scope of the invention.

In the illustrated embodiment, sensor 50 is a linear sensor and includes at least one lens; however, sensor 50 may be any other sensor suitable for focusing light formed by the reflection or transmission of infrared and/or visible light from or through film 20. Sensor 50 may include one or more sensing portions suitable for detecting the phase and intensity of one or more wavelengths of light. Sensor 50 may be integrated with infrared light source 30 or visible light source 40 in, for example, a reflectometer such as an ellipsometer.

Processing computer 60 is a personal computing platform and includes a processor 62 and a memory 64; however, processing computer 60 may be a microcontroller, an application specific integrated circuit, or any other processing device suitable to process data detected by sensor 50 in order to construct, process, and generate a final digital representation of an image captured on film 20. Processing computer 60 may be coupled to other computers and/or digital film processing stations via a communications network. Processor 62 is a central processing unit and memory 64 includes both random-access memory and read-only memory; however, any suitable processor and memory in any combination may be utilized as processor 62 and memory 64. In one embodiment, processing computer 60 is integrated into system 10 as a single system, such as an ASIC processor.

In operation, system 10 uses sensor 50 to collect data from film 20. In one embodiment, system 10 collects data from film 20 at a single development time. Infrared light source 30 emits infrared light during the development of film 20 at a suitable intensity and duration in order to detect the presence of silver grains in film 20. Sensor 50 detects the portion of such emitted infrared light that is transmitted through film 20 using, for example, a lens to focus such light from a suitable portion of film 20 in order to collect optical data to distinguish optical characteristics of such infrared light.

After data is collected during the transmission of infrared light through film 20, visible light from visible light source 40 is transmitted through film 20 to detect and measure the light associated with the individual dye clouds in the film 20. In one embodiment, optical data collected during infrared scanning may be processed to indicate the optimal time for the emission of visible light. In any case, visible light source 40 emits visible light at a suitable intensity and for a suitable duration for transmission through layers 22, 24, and 26 of film 20 and detection by sensor 50. Unlike infrared light, exposure to visible light will cause the remaining silver halide in the film to react, exposing film 20, and destroying the image stored on the film. Optical data collected by sensor 50 as the result of exposure of film 20 to visible light source 40 may be filtered by processing computer 60 using optical data collected during exposure of film 20 to infrared light source 30. Such processing allows for the correction of erroneous optical data introduced by the presence of elemental silver during earlier infrared scans. Such correction and image enhancement is further described in U.S. Pat. No. 5,266,805, entitled "System and Method for Image Recovery" and issued to Edgar, which is hereby incorporated herein by reference.

In short, the infrared light detects the location and size of the silver grains within film 20. The location and size of the silver grains form a defect map that can be used to correct the optical data produced from the visible light. Accordingly, the combination of infrared light source 30 and visible light source 40 may be used to create two different sets of optical data representative of the image fixed on film 20, which are then processed in combination to remove any imperfections in the final processed digital image caused by the presence of the elemental silver particles. The final processed digital image may then be stored as an image file by processor 62 in memory 64.

Although FIG. 1 illustrates a single infrared light source 30 and visible light source 40 located directly across from a single sensor 50, multiple light sources 30 and 40 may be utilized with multiple sensors 50. In particular, and referring now to FIG. 3, a roll or other array of frames of film 20 may be processed using a film dispensing device 100 that holds film 20 between two or more rollers, sprockets, gears, or other suitable fixtures, applies a suitable developer to film 20 and utilizes a suitable advance mechanism to advance the film frame-by-frame along a processing path 110. Path 110 causes film 20 to be routed through any suitable number of film processing stations 130.

Figure 2:
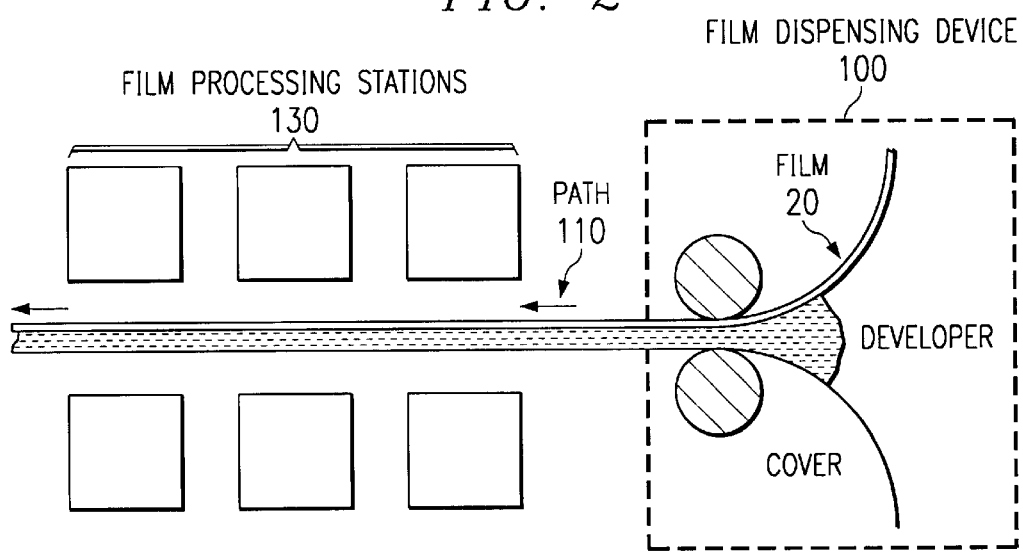
FIG. 2 illustrates a schematic diagram of one or more film processing stations that may be utilized to implement the teachings of the present invention.

In the embodiment illustrated in FIG. 2, multiple film processing stations 130 are utilized to detect infrared light transmitted through or reflected from film 20 using one or more infrared light sources 30 and one or more sensors 50. A following film processing station 130 or group of film processing stations are utilized to detect visible light and/or infrared light transmitted through or reflected by film 20 using one or more light sources 30 and 40 and one or more sensors 50. Each of film processing stations may be coupled to one or more processing computers 60. Film processing stations 130 may be used to process particular frames of film 20 in an assembly-line like process whereby frames move consecutively along path 110 at indicated speeds and with suitable pauses such that particular film processing stations 130 adequately process images held on such frames of film 20.

FIG. 3 illustrates another embodiment of digital film processing system 10 using multiple infrared light sources 30 and visible light source 40. In particular, one of infrared light sources 30a and visible light source 40 are positioned and oriented as illustrated in FIG. 1 on the opposite side of film 20 from sensor 50. However, two additional infrared light sources 30b and 30c are positioned on the same side of film 20 as sensor 50. Infrared light sources 30b and 30c are positioned and oriented in such a manner as to allow infrared light emitted to illuminate blue layer 22 of film 20 and reflect off of blue layer 22 such that reflecting light may be detected by sensor 50 and processed by processing computer 60.

In one embodiment, infrared light from infrared light sources 30b and 30c is emitted at a particular intensity and duration after the application of a developer to the exterior of blue layer 22. Infrared light reflecting off of blue layer 22 is then collected by sensor 50. Next, infrared light source 30a is used to transmit infrared light through all layers 22, 24, and 26 of film 20 so that light passing through film 20 may be detected by sensor 50. Finally, visible light source 40 is used as described in FIG. 1 to collect data on the dye clouds of the film 20.

The embodiment illustrated in FIG. 3 has the advantage of being able to collect image data for blue layer 22 independently of green layer 24 and red layer 26. By collecting optical data from blue layer 22 individually, such blue layer data may be filtered or divided out, by processing computer 60, from optical data obtained via the through scan performed by transmitting infrared light through all of layers 22, 24, and 26. As optical data from green layer 24 and red layer 26 is usually more difficult to distinguish than optical data from blue layer 22, improved processing of image data associated with such layers 24 and 26 will result once data from blue layer 22 is eliminated from consideration. Such an advantage of distinguishing data from blue layer 22 also allows an easier determination of when to begin the interval during which visible light is emitted by visible light source 40. Such a determination is easier because now such determination may focus on the optimal time for image data included only within green layer 24 and red layer 26.

As described with reference to FIG. 1, the embodiment illustrated in FIG. 3 may be implemented by processing film 20 along path 110 using film dispensing device 100 as illustrated in FIG. 2. Again, one or more film processing stations 130 may be utilized to perform the collection of optical data for blue layer 22 using infrared light sources 30b and 30c and one or more sensors 50. A second group of one or more film processing stations 130 may be used to perform the through scan of the transmission of infrared light through film 20 using one or more infrared light sources 30a and one or more sensors 50. A third group of one or more film processing stations 130 may then be utilized to detect visible light transmitted through film 20 using one or more visible light sources 40 and one or more sensors 50.

FIG. 4 illustrates yet another embodiment of digital film processing system 10 used to process film 20. In the embodiment illustrated in FIG. 3, infrared light sources 30 and visible light sources 40 are used in combination with multiple sensors 50 in order to more accurately detect a latent image stored within film 20. In digital film processing system 10, two infrared light sources 30 are positioned on either side of film 20, one sensor 50 is positioned on either side of film 20, and two visible light sources 40 are positioned on the side of film 20 most proximate to red layer 26. In particular, infrared light sources 30b and 30c are again positioned and oriented in such a manner as to allow infrared light emitted to illuminate blue layer 22 of film 20 and reflect off of blue layer 22 such that reflecting light may be detected by sensor 50a and processed by processing computer 60. Infrared light sources 30a and 30d are positioned and oriented in such a manner as to allow infrared light emitted to illuminate red layer 26 of film 20 and reflect off of red layer 26 such that reflecting light may be detected by sensor 50b and processed by processing computer 60. Infrared light sources 30a and 30d are also positioned and oriented in such a manner as to allow the transmission of infrared light through layers 22, 24 and 26, the detection of such transmitted infrared light by sensor 50a, and the processing of such transmitted light by processing computer 60. Visible light sources 40 are positioned and oriented as to allow the transmission of visible light through layers 22, 24 and 26 for detection by sensor 50a and processing by processing computer 60.

In operation, infrared light from infrared light sources 30b and 30c is emitted at a certain interval after the application of a developer to the exterior of blue layer 22. Infrared light reflecting off of blue layer 22 is then collected by sensor 50a. Then, infrared light sources 30a and 30d emit infrared light to the exterior of red layer 26. Infrared light reflecting off of red layer 26 is then collected by sensor 50b. Next, infrared light sources 30a and 30d are used to transmit infrared light through all layers 22, 24, and 26 of film 20 so that light passing through film 20 may be detected by sensor 50a. Finally, visible light sources 40 are used as described in FIG. 1 to collect data on the dye clouds on the film 20. The embodiment illustrated in FIG. 4 has the advantage of being able to collect image data from blue layer 22 and red layer 26 independently of each other and green layer 24. By collecting optical data individually from blue layer 22 and red layer 26, such blue layer data and red layer data may be filtered or enhanced, by processing computer 60, using optical data obtained via a through scan performed by transmitting infrared light through all of layers 22, 24, and 26. As optical data from green layer 24 is usually the most difficult to distinguish, improved processing of image data associated with such layer 24 and will result once data from blue layer 22 and red layer 26 is eliminated from consideration. Such an advantage of distinguishing data from blue layer 22 and red layer 26 also allows an easier determination of when to begin the interval during which visible light is emitted by visible light source 40.

As described with reference to FIG. 1, the embodiment illustrated in FIG. 4 may be implemented by processing film 20 along path 110 using film dispensing device 100 as illustrated in FIG. 2. Again, one or more film processing stations 130 may be utilized to perform the collection of optical data for blue layer 22 using infrared light sources 30b and 30c and one or more sensors 50a. Also, a second group of one or more film processing stations 130 may be utilized to perform the collection of optical data for red layer 26 using infrared light sources 30a and 30d and one or more sensors 50b. A third group of one or more film processing stations 130 may be used to perform the through scan of the transmission of infrared light through film 20 using infrared light sources 30a and 30d one or more sensors 50a. A fourth group of one or more film processing stations 130 may then be utilized to detect visible light transmitted through film 20 using one or more visible light sources 40 and one or more sensors 50a.

FIG. 5 illustrates a flowchart of one embodiment of a digital film development process using visible light as described in FIG. 1. In step 510, infrared light source 30 emits infrared light through layers 22, 24, and 26 of film 20 at suitable intensities and durations in order to detect the presence of silver halides in film 20. In step 520, sensor 50 detects infrared light that has been transmitted through film 20. In particular, sensor 50 may detect optical data associated with the size and location of the silver grains. In step 530, visible light source 40 emits visible light at a suitable intensity and for a suitable duration for transmission through layers 22, 24, and 26 of film 20. In step 540, visible light transmitted through layers 22, 24, and 26 of film 20 is detected by sensor 50. Again, sensor 50 may detect optical data associated with the colors associated with each dye cloud in layers 22, 24 and 26. In step 550, optical data collected by sensor 50 from infrared light in step 540 may be filtered or divided out from optical data collected by sensor 50 from visible light in step 520. By dividing out such optical data associated with infrared light, processing computer 60 may correct for erroneous optical data introduced into an image by the presence of elemental silver. As earlier described, the combination of infrared light data and visible light data may be used to create two different sets of optical data representative of the image formed on film 20, which may then be processed in combination to remove any imperfections in the final processed digital image that were caused by the presence of elemental silver particles.

FIG. 6 illustrates a flowchart of one embodiment of a digital film development process as described in FIG. 3 and using visible light and the independent collection of optical data associated with blue layer 22. In step 610, infrared light from infrared light sources 30b and 30c is emitted at a particular intensity and duration to the exterior of blue layer 22. In step 620, infrared light reflecting off of blue layer 22 is detected by sensor 50 and optical data is collected. In step 630, infrared light source 30a transmits infrared light through all layers 22, 24, and 26 of film 20. In step 640, sensor 50 detects the transmitted infrared light and obtains optical data such as the size and location of silver grains in the film 20. In step 650, visible light source 40 is transmitted through layers 22, 24, and 26 of film 20. In step 660, sensor 50 detects the transmitted visible light and collects optical data such as data relative to the colors associated with each dye cloud in layers 22, 24, and 26. In step 670, optical data received during the transmission of infrared light as described in steps 650 and 660 may be filtered or divided out from the optical data collected during the transmission of visible light in steps 630 and 640. In step 680, optical data for blue layer 22 collected from the reflection of infrared light as described in steps 610 and 620 may be used for filtering or otherwise to create final image data. In step 690, data resulting from the filtering described in steps 670 and 680 may be utilized to enable more accurate processing of the images formed on green layer 24 and red layer 26 of film 20. Such improved processing of layers 24 and 26 may result in a clearer more definite image that does not include erroneous data created by the presence of elemental silver in film 20.

Figure 7:
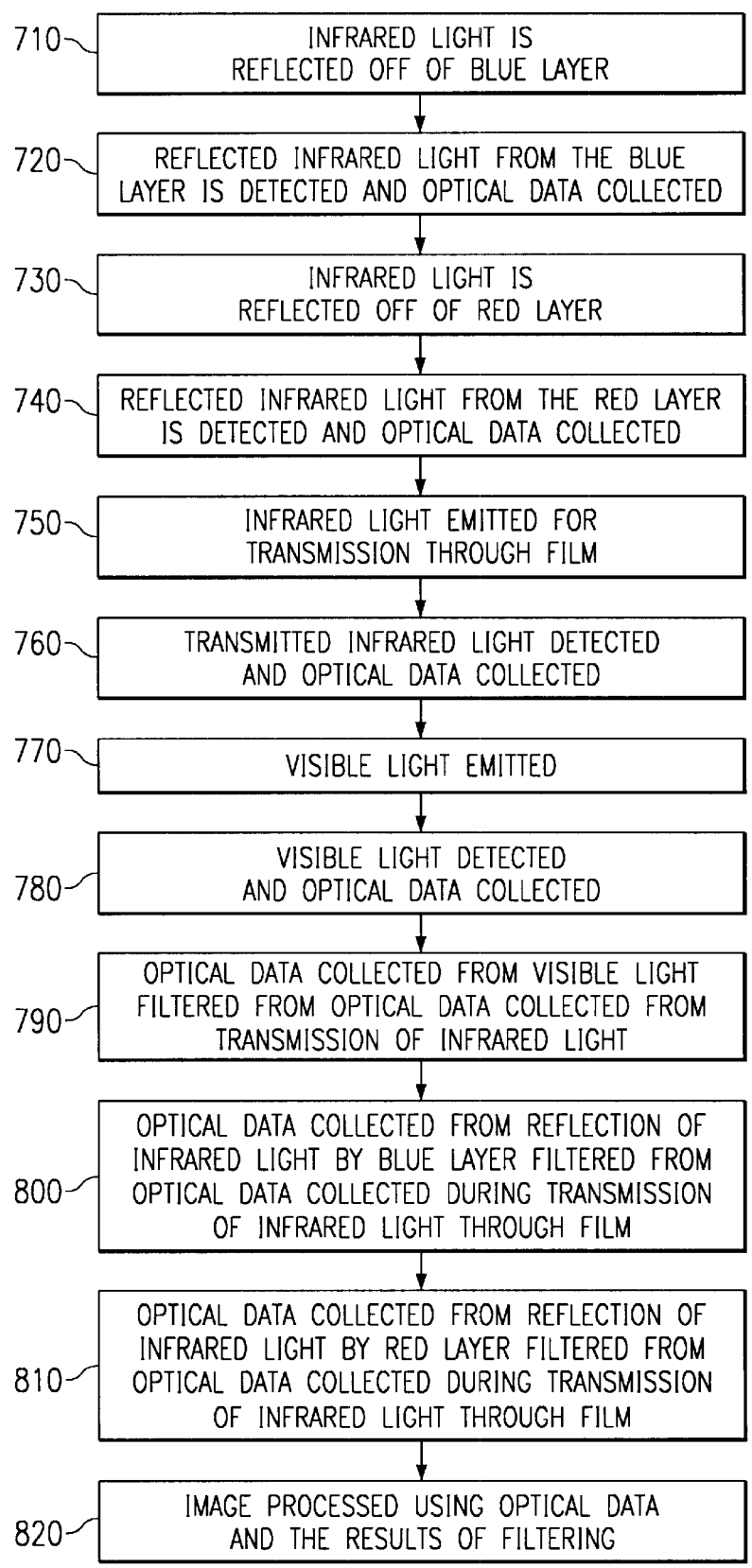
FIG. 7 illustrates a flowchart of an additional embodiment of a digital film development process using visible light and the independent collection of optical data associated with blue and red layers of film.

FIG. 7 illustrates a flowchart of one embodiment of a digital film development process using visible light and the independent collection of optical data associated with blue layer 22 and red layer 26. In step 710, infrared light from infrared light sources 30b and 30c is emitted at a particular interval, intensity, and duration to the exterior of blue layer 22. In step 720, infrared light reflecting off of blue layer 22 is detected by sensor 50a and optical data is collected. In step 730, infrared light from infrared light sources 30a and 30d is emitted at a particular intensity and duration to the exterior of red layer 26. In step 740, infrared light reflecting off of red layer 26 is collected by sensor 50b. In step 750, infrared light sources 30a and 30d transmit infrared light through all layers 22, 24, and 26 of film 20. In step 760, sensor 50a detects the transmitted infrared light and collects optical data about the transmitted infrared light. In step 770, visible light is transmitted by visible lights sources 40 through layers 22, 24, and 26 of film 20. In step 780, sensor 50a detects the transmitted visible light and collects optical data. In step 790, optical data received from a transmission of infrared light in steps 770 and 780 may be filtered or divided out from the optical data collected during the transmission of visible light in steps 750 and 760. In step 800, optical data for blue layer 22 collected from the reflection of infrared light described in steps 710 and 720 may be used for filtering or to create final image data. In step 810, optical data for red layer 26 collected from the reflection of infrared light described in steps 730 and 740 may be used for filtering or to create final image data. Steps 790, 800, and 810 may also be used in combination to perform multiple levels of filtering on the optical data collected during the transmission of infrared light and/or visible light. In step 820, data resulting from the filtering described in steps 790, 800 and 810 may be utilized to enable more accurate processing of the individual images formed on blue layer 22, green layer 24, and red layer 26 of film 20. This is particularly useful because of difficulty in isolating optical data attributable to the image formed on green layer 24 using convention processing. Such improved processing of layers 22, 24, 26 may result in a clearer more definite image that does not include erroneous data created by the presence of elemental silver in film 20.

In an alternative embodiment, the infrared light reflected from blue layer 22 in step 710, is used to contrast the image data for the blue layer 22. Similarly, the infrared light reflected from red layer 26 in step in step 730 is used to contrast the image data for the red layer 26. Accordingly, improved image processing may result.

Although the present invention has been described in detail, it should be understood that various changes, alterations, substitutions and modifications may be made to the teachings described herein without departing from the spirit and scope of the invention which is solely defined by the appended claims.

What is claimed is:

1. A system for digitizing developing film, the system comprising:

an applicator operable to apply a developer solution to a film that develops the film;

an infrared light source operable to illuminate the developing film and developer solution;

a visible light source operable to illuminate the developed film and developer solution, and exposes silver halide contained within the film;

at least one sensor operable to collect a first set of optical data associated with infrared light from the developing film and a second set of optical data associated with visible light from the developed film; and a processor in communication with the at least one sensor, the processor operable to determine an image on the film in response to the first and second sets of optical data.

2. The system of claim 1, wherein the infrared light source and the visible light source are disposed on a first side of the film and the at least one sensor is disposed on a second side of the film.

3. The system of claim 1, wherein the visible light source is operable to individually produce red, blue and green light.

4. The system of claim 1, wherein the visible light source is operable to produce white light.

5. The system of claim 1, wherein the at least one sensor is a linear sensor.

6. A method of digital film development, the method comprising:

applying a developing solution to a film; and processing an image on the film in response to optical data collected during a transmission of visible light through the film and developing solution, wherein the visible light causes exposure of silver halide within the film.

7. The method of claim 6, and further comprising:

transmitting infrared light through the film;

collecting additional optical data from the transmitted infrared light; and processing the image in response to comparing the optical data to the additional optical data.

8. A system for processing film, the system comprising:

an applicator system operable to apply a processing solution to the film to initiate development of a silver record and a dye record within the film;

a scanning system operable to digitize both the silver record and the dye record; and a processor coupled to the scanning system and operable to receive the digitized silver record data and digitized dye record data and produce a digital image.

9. The system of claim 8, wherein the silver record and the dye record are recorded as a single digitized image.

10. The system of claim 9, wherein the scanning system comprises at least one light source operable to produce light within at least a portion of the visible light spectrum.

11. The system of claim 8, wherein the scanning system comprises at least one light source operable to produce light within at least a portion of the infrared light spectrum.

12. The system of claim 8, wherein the scanning system comprises:

a first light source operable to produce light within at least a portion of the visible light spectrum for digitizing the dye record and the silver record; and a second light source operable to produce light within at least a portion of the infrared light spectrum for digitizing the silver record.

13. The system of claim 12, wherein the scanning system further comprises a sensor system operable to measure the visible and infrared light transmitted through the film.

14. The system of claim 13, wherein the scanning system further comprises a third light source operable to produce light reflected from the film.

15. The system of claim 14, wherein the third light source operates to produce light within at least a portion of the infrared light spectrum.

16. The system of claim 15, wherein the scanning system comprises a sensor system operable to measure the visible light transmitted through the film and infrared light reflected from the film.

17. A method of developing and digitizing undeveloped film, the method comprising:

applying a processing solution to the undeveloped film to initiate development of a dye record and a silver record within the film;

collecting a first set of optical data associated with the silver record;

collecting a second set of optical data associated with the dye record; and modifying the second set of optical data using the first set of optical data to produce a digital image.

18. The method of claim 17, wherein collecting a first-set of optical data comprises collecting a first set of optical data associated with infrared visible light transmitted through the film and processing solution.

19. The method of claim 17, wherein collecting a first set of optical data comprises collecting a first set of optical data associated with infrared visible light reflected from the film.

20. The method of claim 17, wherein the visible light comprises the separate transmission of red, blue, and green light through the film and processing solution.

21. The method of claim 17, wherein modifying the second set of optical data using the first set of optical data comprises proportionally correcting the second set of optical data using the first set of optical data.

22. The method of claim 17, wherein modifying the second set of optical data using the first set of optical data comprises using the first set of optical data to determine parameters for collecting the second set of optical data.

23. The method of claim 17, wherein modifying the second set of optical data using the first set of optical data comprises using the first set of optical data to determine processing parameters for the second set of optical data.

24. The method of claim 17, further comprising the step of illuminating the film with white light.

* * * * *

UNITED STATES PATENT AND TRADEMARK OFFICE
CERTIFICATE OF CORRECTION

PATENT NO.   : 6,540,416 B2
DATED        : April 1, 2003
INVENTOR(S)  : Edgar, Albert D. et al.

It is certified that error appears in the above-identified patent and that said Letters Patent is hereby corrected as shown below:

Column 11,
Line 19, change "first-set" to -- first set --.

Signed and Sealed this

First Day of July, 2003

JAMES E. ROGAN
*Director of the United States Patent and Trademark Office*